Sept. 9, 1924.

V. A. WALKUP 1,507,804

RESILIENT WHEEL

Filed Feb. 16, 1923  2 Sheets-Sheet 1

WITNESSES
Guy M Spring
George D. Wright

Inventor
VINCENT A. WALKUP

By Richard B. Owen
Attorney

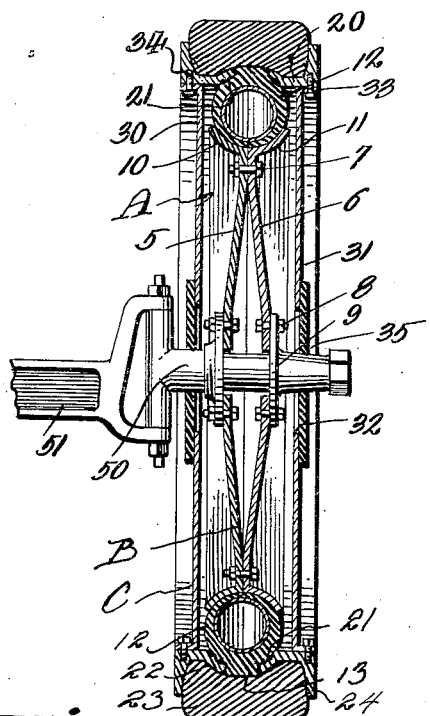
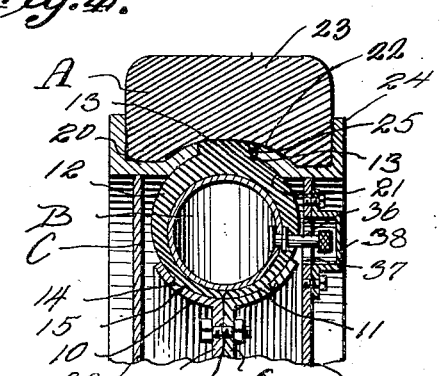

Patented Sept. 9, 1924.

1,507,804

UNITED STATES PATENT OFFICE.

VINCENT A. WALKUP, OF APACHE, OKLAHOMA.

RESILIENT WHEEL.

Application filed February 16, 1923. Serial No. 619,423.

*To all whom it may concern:*

Be it known that I, VINCENT A. WALKUP, a citizen of the United States, residing at Apache, in the county of Caddo and State of Oklahoma, have invented certain new and useful Improvements in a Resilient Wheel, of which the following is a specification.

This invention relates to wheels which are particularly adaptable for association with motor vehicles and the primary object of the invention is to provide a wheel, which will have all of the advantages of a wheel equipped with a pneumatic tire, but none of the disadvantages thereof, such as blowouts, punctures and the like.

Another object of the invention is to provide a resilient wheel embodying an inner wheel member having a pneumatic tire associated therewith and an outer wheel member resting upon and enclosing said pneumatic tire, the outer wheel member having a wear tread surface formed thereon for engaging the ground, the inner and outer wheel members being so associated, as to prevent the entrance of dust and dirt, into the inner wheel member.

A further object of the invention is to provide a resilient wheel, formed of sheet metal or the like, which will be of light weight, yet capable of withstanding all shocks transmitted thereto.

A further object of the invention is to provide novel means for connecting the pneumatic tire with a rim of the outer wheel member, so as to prevent the slipping between the inner wheel member and the outer wheel member.

A still further object of the invention is to provide an improved resilient wheel of the above character, which will be durable and efficient in use, one which will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, forming a part of this specification, in which drawings:

Figure 3 is a diametric section through the improved resilient wheel, illustrating the improved resilient wheel, illustrating the means of associating the same with a steering wheel spindle.

Figure 4 is an enlarged fragmentary section through the periphery of the improved resilient wheel.

Referring to the drawings in detail, wherein similar reference characters designate corresponding parts throughout the several views the letter A generally indicates the improved resilient wheel, which includes the inner wheel member B, and the outer wheel member C.

Figure 1:
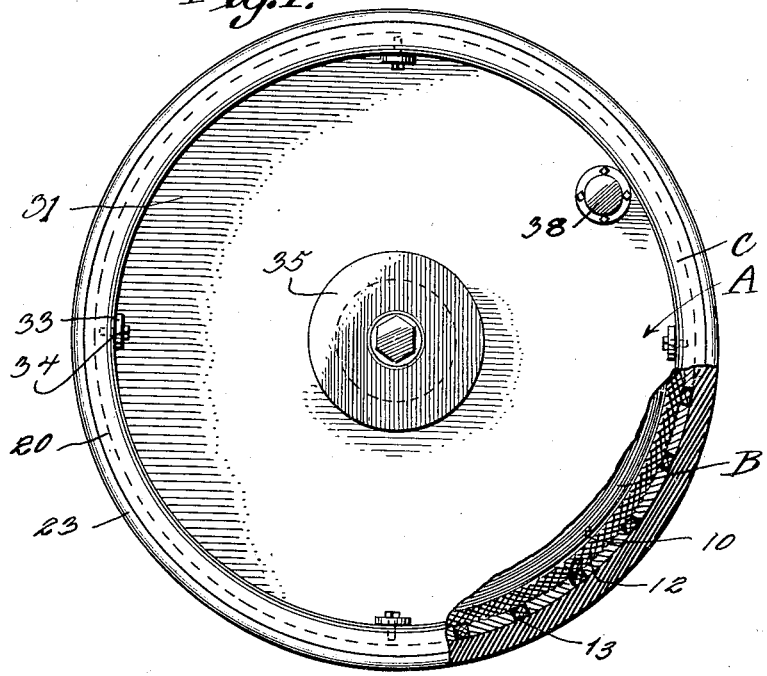
Figure 1 is a side elevation of the improved resilient wheel, showing parts thereof broken away, to illustrate the means of associating the inner wheel member, with the outer wheel member.
Figure 2:
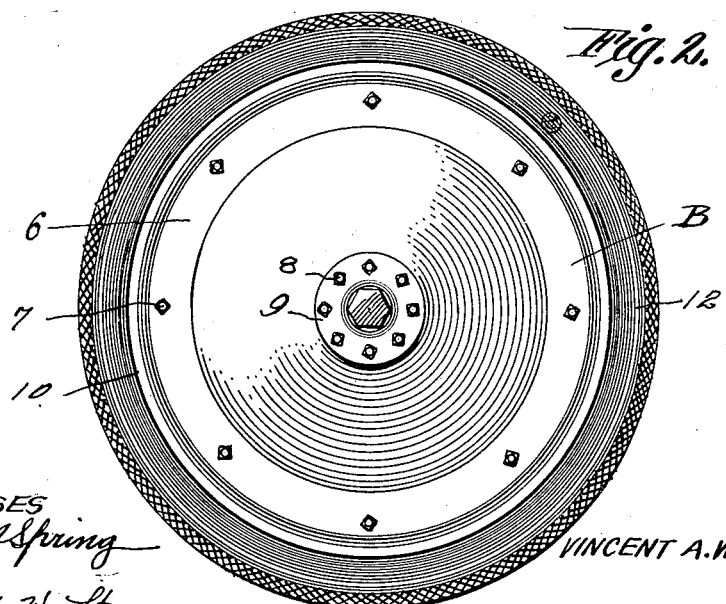
Figure 2 is an elevation of the inner wheel member.

The inner wheel member B comprises a pair of concavo-convex shaped disks 5 and 6, which are connected together adjacent to their outer ends by means of bolts or the like 7. The inner portion or axial center of these disks 5 and 6 are provided with openings for receiving the hub and these disks are supported or otherwise secured, as at 8 to annular hub flanges 9. The peripheries of the disks 5 and 6 are provided with integral outwardly extending bowed flanges 10 and 11, which constitute a rim for receiving any preferred type of pneumatic tire 12. This pneumatic tire 12 may be of the type commonly employed on bicycle wheels or may be of the type commonly used on automobile wheels. The periphery of the tire 12 however is provided with radially projecting drive lugs 13, the purpose of which, will be hereinafter more fully described. These lugs 13 can be arranged in circumferential relation around the tire. The abutting portions of the tire which engage the flanges 10 and 11 can also be provided with similar lugs 14 for engaging in suitable openings 15 formed in said flanges, whereby a positive driving contact is established between the inner disks 5 and 6 and said tire.

The outer wheel member comprises a rim 20 having an inner concave surface 21 to form a seat for the pneumatic tire 12 and an outer convex surface 22 for forming a seat for the tread 23, which can be formed of solid rubber if so desired. The side edges of the rim 20 are provided with outwardly extending annular flanges 24 for engaging the sides of the tread or tire 23 to prevent displacement thereof. This rim 20 is preferably formed of metal of light weight and of the desired thickness and can be provided with one or more rows of openings 25 for receiving the drive lugs 13 on the pneumatic tire 12.

Now the inner surface of the rim 20 has secured thereto on each side of the inner wheel member B and in spaced relation thereto flat disk-shaped guard plates 30 and 31. The axial centers of the disks 30 and 31 are provided with relatively large openings 32 for permitting the passage of the hub of the inner wheel member therethrough. These relatively large openings 32 permit free movement of the hub member or free movement of the rim 20 and the plates 30 and 31 in relation to said hub member. As clearly shown in Figure 3 of the drawings the disk plates 30 and 31 are provided at spaced points with outwardly extending attaching lugs 33 which can be bolted or riveted as at 34 to said rim 20. It is preferred however to have one of the plates 30 or 31 freely removable in order to permit access to be readily had to the inner wheel member B.

In order to prevent the entrance of dust, dirt and the like into the outer wheel member suitable flexible disks, formed of rubber or the like 35 are placed against the outer faces of the disk plates 30 and 31 and these flexible plates 35 snugly engage the hub.

A suitable inflation valve 36 is provided for the pneumatic tire 12 and this valve 36 extends through a suitable opening 37 formed in the disk plate 31 and a removable cover 38 can be provided for said openings.

The improved resilient wheels can either be used on the drive axle, or as shown on the steering wheel spindles 50 of a dead axle 51 of a motor vehicle and it is to be understood that the only changes in the wheel necessary to allow the same to be used on the drive axle or on the steering wheel spindles is in the construction of the hub.

From the foregoing description, it can be seen that an exceptionally simple and durable resilient wheel has been provided, which will give all the benefits derived from the use of a pneumatic tire, without any disadvantages heretofore inherent with the use thereof.

From the construction of the outer wheel member C the entrance of rain or the like in said wheel member is effectively prevented, whereby the pneumatic cushioning member 12 is fully protected from the elements.

Changes in details may be made without departing from the spirit or the scope of this invention.

What I claim as new is:—

As a new article of manufacture a resilient wheel comprising an inner wheel member including a hub having spaced annular flanges formed thereon, concavo-convex shaped disks secured to the inner surfaces of said flanges, an integral rim formed on the periphery of said disks, a pneumatic cushioning member connected to said rim, an outer wheel member including a rim having a seat formed on the inner surface thereof for receiving the cushioning member, said seat being provided with spaced openings, a seat formed on the periphery of the rim of the outer wheel member, a tread fitted in said last mentioned seat, driving lugs formed on the cushioning member fitted in said openings in the inner seat, guard disks secured to the rim of the outer wheel member arranged on each side of the disks of the inner wheel member, and flexible disks secured to the hub of the inner wheel member and contacting the outer surface of the guard disks of the outer wheel member.

In testimony whereof I affix my signature in presence of two witnesses.

VINCENT A. WALKUP.

Witnesses:
 EDITH RAE,
 LEW CALDER.